(12) United States Patent
Baur et al.

(10) Patent No.: US 6,335,041 B1
(45) Date of Patent: Jan. 1, 2002

(54) DRY COMPOSITION FOR BATTER COATING COMPRISING SOFT WHEAT FLOUR AND LEAVENING SYSTEM

(75) Inventors: Joachim N. C. Baur, Newcastle; Kenneth S. Darley, Whitby, both of (CA)

(73) Assignee: Griffith Laboratories Worldwide Inc., Alsip, IL (US)

( * ) Notice: Subject to any disclaimer, the term of this patent is extended or adjusted under 35 U.S.C. 154(b) by 0 days.

(21) Appl. No.: 09/117,410

(22) PCT Filed: Feb. 11, 1997

(86) PCT No.: PCT/CA97/00095
§ 371 Date: Apr. 21, 2000
§ 102(e) Date: Apr. 21, 1999

(87) PCT Pub. No.: WO97/29653
PCT Pub. Date: Aug. 21, 1997

Related U.S. Application Data

(60) Provisional application No. 60/011,469, filed on Feb. 12, 1996.

(51) Int. Cl.$^7$ .................................................. A23G 3/00
(52) U.S. Cl. ........................... 426/94; 426/93; 426/95; 426/549; 426/555; 426/552; 426/561; 426/562
(58) Field of Search ........................... 426/94, 551, 93, 426/95, 549, 552, 555, 243, 561, 562

(56) References Cited

U.S. PATENT DOCUMENTS

| | | | | |
|---|---|---|---|---|
| 3,956,515 A | * | 5/1976 | Moore et al. ............... | 426/302 |
| 4,391,838 A | * | 7/1983 | Pate ........................... | 426/606 |
| 4,778,684 A | * | 10/1988 | D'Amico et al. ............ | 426/291 |
| 5,009,903 A | * | 4/1991 | DeFiguerido et al. ....... | 426/243 |
| 5,153,018 A | * | 10/1992 | Lajoie et al. ................ | 426/551 |
| 5,431,944 A | | 7/1995 | Melvej ........................ | 426/552 |
| 5,520,937 A | * | 5/1996 | Yasosky et al. ............... | 426/94 |
| 5,609,904 A | * | 3/1997 | Koh et al. ................... | 426/565 |
| 5,770,252 A | * | 6/1998 | McEwen et al. ............. | 426/292 |

FOREIGN PATENT DOCUMENTS

| | | |
|---|---|---|
| EP | 0 155 760 | 9/1985 |
| EP | 0 382 473 | 8/1990 |
| WO | 94 21143 | 3/1994 |

* cited by examiner

Primary Examiner—Milton I. Cano
Assistant Examiner—Philip DuBois
(74) Attorney, Agent, or Firm—Sim & McBurney

(57) ABSTRACT

An improved tempura batter system comprises an improved primer layer and improved batter matrix layer. The batter matrix is formed from a controlled gelling of batter-forming components which balances control of gelatinization, coagulation and gelation with cellular network expansion while managing water mobility and quantity. A balancing of cereals, proteins, leavening system, fat and emulsifier produces effective gelatinization characteristics and controlled formation of outer shell. A network of well-distributed, uniformly-sized gas cells is provided throughout the matrix by employing an aerated and/or emulsified plastic fat.

21 Claims, No Drawings

DRY COMPOSITION FOR BATTER COATING COMPRISING SOFT WHEAT FLOUR AND LEAVENING SYSTEM

REFERENCE TO RELATED APPLICATIONS

This application is a US National Phase filing pursuant to 35 USC 371 of PCT/CA97/00095 filed Feb. 11, 1997 and claims the benefit under 35 USC 119(e) of U.S. Provisional Patent Application No. 60/011,469 filed Feb. 12, 1996.

FIELD OF THE INVENTION

The present invention relates to a novel batter system for application to a foodstuff for retail or food service type application.

BACKGROUND TO THE INVENTION

Many foodstuffs, including meat, fish, fruits and vegetables, which are packaged in a frozen condition for retail sale or for use in a food service application, have a coating applied to a raw or partially-cooked food substrate. The foodstuff is heated and fully cooked for consumption by convection or microwave ovenizing or frying, depending on the foodstuff.

One such food coating is a tempura-like batter coating, which is a leavened batter. Such tempura batter coating generally comprises a primer layer consisting of an initial batter as a wetting and/or adhesive agent and/or a fine granular cereal crumb to precondition the surface to be coated. The tempura batter matrix generally contains flour, starches, proteins, leavening components, browning and flavouring agents.

A common problem with conventional tempura batters is that, while a crispy outer surface to the cooked batter can be obtained when reconstituting the food for consumption, an interface between the substrate and the crispy outer surface is formed which is wet, heavy and pasty, which detracts from the overall organoleptic quality or mouthfeel of the food product. This problem is particularly acute with food substrates which have a high moisture content, including fish, shellfish, fruit and vegetables. Often an even dispersion of the leavening gases is not achieved and gas cells coalesce to form pockets beneath the shell. In addition, the cooked shell of the coated substrate often has a rubbery texture, particularly when the foodstuff is oven cooked.

There is, therefore, a need for an improved tempura batter system which enables, upon cooking of a food substrate bearing the batter to an edible condition, the wet interface to be eliminated, the leavening gas to be evenly distributed and the coating to have a light and crisp eating quality, with a perception of a reduced layer of coating material.

SUMMARY OF INVENTION

In accordance with the present invention, there is provided an improved tempura batter system which enables significant improvements in the existing tempura batter systems to be achieved. The present invention involves improvements in both the primer layer or first pass system and the batter matrix layer.

When adhesion and/or improved coating coverage of the food substrate is desired, an underlying coating system is required. This system is optimized herein to maximize surface area while minimizing the contribution of mass to the overall coating, to optimize gelatinization and gelation and to manage water mobility in and through the layer. While the primer layer may comprise as much as about 20 to 30 wt % of the overall mass of a conventional tempura coating, it is contemplated herein to reduce this contribution to the overall mass to less than about 15 wt % of the overall coating mass. This may be achieved by providing a more dilute starch based batter and a finer granulation predust. The decrease in mass contribution and the choice of the first pass batter components and type of cereal predust, enables moisture release from the food substrate to and through the overlying tempura layer to be maximized and thereby contribute to decreased interface sogginess and vapour pressure build up.

A controlled gelling matrix is provided herein for the outer tempura coating in order to set the gas cell structure and permit effective penetration of heat during processing to thereby provide balancing of control of gelatinization, coagulation and gelation with cellular network expansion while managing water mobility and quantity in the batter system. As described in more detail below, a balancing of cereals, proteins, leavening system, fat and emulsifier is provided which produces effective gelatinization characteristics and a controlled formation of the outer shell.

A stabilized network of well-distributed, uniformly-sized gas cells throughout the matrix, which remain intact and do not coalesce or rupture within the batter matrix during continued mechanical agitation through mixing or application machinery and have controlled expansion during heating, permits a more effective heat transfer and affects positively the gelatinization, coagulation and water mobility characteristics of the batter system. As described in more detail below, these results may be achieved by employing an aerated and/or emulsified plastic fat or a semi-melted, emulsified plastic fat in addition to conventional leavening agents. Significant textural and/or visual benefits are derived by using such materials when compared to oils, fully melted plastic and powdered fats.

The coated food products provided in accordance with the present invention exhibit exceptional long-term freezer storage as compared to conventional tempura batter systems.

The batter composition provided herein may be employed in cohesion and/or adhesion style batter systems which act as an adhesive and/or cementing layer in which bread crumb material may be embedded.

GENERAL DESCRIPTION OF INVENTION

In providing a suitable tempura batter system, a balance between cereal (flour, starches, dextrins etc.) components, added protein, the leavening system, fat and emulsifier is sought in order to minimize or even eliminate shelling characteristics of the batter. In this regard, an important component is the flour. Conventionally, soft wheat flour is employed as a significant component of the dry mix from which the batter is formed, percentages as high as about 80 to about 90% not being uncommon. We have found that higher quantities of soft wheat flour lead to a greater tendency to shell.

In the present invention, the quantity of soft wheat flour is maintained below about 75 wt % of the dry mix, preferably about 45 to about 65 wt % of the dry mix. Higher gluten-containing flours, such as hard wheat flour, produce undesirable shelling properties.

Starches are used herein to make up the bulk of the dry mix not provided by the decreased quantity of soft wheat flour. A variety of unmodified starch materials can be used, particularly native wheat starch, although other starches, such as corn starch, tapioca starch and potato starch may be employed, along with film-forming starch materials, such as modified corn starch. The latter component restores crispiness and crunchiness lost by decreasing the wheat gluten component through the use of a limited quantity of soft wheat flour in order to avoid shell formation.

The total percentage of unmodified starches and modified starches which are employed in the batter mix vary with the amount of soft wheat flour. In general, the total percentage of such starches is from about 10 to about 35 wt %, preferably from about 15 to about 30 wt %. The relative proportions of the unmodified starches and modified starches in the batter dry mix generally may vary from 0 to about 30 wt % unmodified starches, preferably about 5 to about 25 wt %, and from 0 to about 30 wt % modified starches, preferably about 5 to about 15 wt %.

In addition to starch augmentation, in order to further compensate for a reduction in the soft wheat flour component, protein material may be added to provide improved properties to the batter. The proteins generally are a mix of such materials to provide a variety of improved properties. The presence of the protein material adds colour to cooked food product. Gelling proteins assist with the enrobing qualities of the batter, overall emulsification of materials and maintaining the gases dispersed in the batter. Non-gelling proteins provide an enhanced crispness. Some of the protein materials which may be employed include egg albumin, soya proteins and modified milk proteins, such as sodium caseinate.

Quantities of total additional proteins may vary and the upper level of such materials generally is determined by cost considerations and may generally be about 3.5 wt %. Generally, both gelling and non-gelling proteins are used, generally in approximately equal weight proportions.

Frosted, freezer-burnt, dehydrated or reticulated are terms which are used to describe the undesirable lace-like surface appearance of many coated products that are fully fried to cook to an edible state. The tempura batter system of the present invention results in the improvements as described for an oven cook application. For such system, further modifications to the formulation are desirable to eliminate the frosting potential while retaining the desirable textural improvements.

The gelling and non-gelling isolates, as well as the shortening, are major contributors to the frosting phenomenon encountered with the fully-fried products. To a lesser degree, the emulsifier also contributes to this negative appearance attribute. As may be seen from the experimentation presented in Example 8 to 11 below, the gelling isolate and emulsifier are retained for their major structural and textural contribution, while the non-gelling protein sodium caseinate and non-gelling isolate have been removed and the level of shortening reduced. Additional dextrin and maltodextrin may be added to offset the reduction in shortening.

A leavening system comprising food-grade components which interact in the presence of water and/or heat to produce $CO_2$ is employed in the batter dry mix. In particular, there is employed a combination of sodium bicarbonate and sodium acid pyrophosphate with an excess of the latter based on its neutralizing value, as may be found in some commercial baking powder blends. Usually neutralizing value percentages are used in coating batter systems. Higher amounts of sodium bicarbonate tend to enhance the overall browning characteristics of the batter.

Additional components of the leavening system are monocalcium acid phosphate and calcium lactate. The presence of excess sodium acid pyrophosphate, which may be up to about 50 wt % excess over the amount required to neutralize the sodium bicarbonate not reacted with the monocalcium acid phosphate, ensures that all the sodium bicarbonate is neutralized and further provides overall improved textural characteristics by decreasing the cohesiveness of the shell.

The presence of the monocalcium acid phosphate, which may neutralize about 15 to about 35 wt % of the sodium bicarbonate, ensures an initial rapid release of carbon dioxide from the sodium bicarbonate, not achievable by the slower reacting sodium acid pyrophosphate. The initial release of $CO_2$ also aids in establishing gas cell nuclei and helps increase batter volume. Furthermore, use of monocalcium acid phosphate allows for use of elevated sodium bicarbonate levels in a batter, enhancing coloration during heating of the coating system without excessive puffing of the enrobed substrate. Puffing is reduced since the gas is formed prior to the gelatinization, coagulation and hardening of the enrobing matrix. The presence of the calcium lactate provides a controlled release of acid from the sodium acid pyrophosphate, helps mask the astringent flavour imparted by the excess sodium acid pyrophosphate and enhances the overall textural quality of the batter.

The overall quantity of leavening agents present in the dry batter mix may comprise about 1 to about 5 wt %, preferably about 1.5 to about 3 wt %, of the dry batter mix. The quantities (wt %) of the individual components of the leavening agents in the dry batter mix may comprise:

|  | Generally | Preferably |
| --- | --- | --- |
| Sodium bicarbonate | about 0.4 to about 1.5 | about 0.6 to about 1.2 |
| Sodium acid pyrophosphate | about 0.5 to about 2.2 | about 0.8 to about 1.7 |
| Monocalcium phosphate | about 0.1 to about 0.6 | about 0.2 to about 0.5 |
| Calcium lactate | about 0.03 to about 0.15 | about 0.06 to about 0.12 |

The combination of components described above helps provide effective gelatinization characteristics and a controlled formation of the outer shell from the batter mix.

In order to provide a stabilized network of well-distributed, uniformly-sized gas cells throughout the batter matrix, there may be employed an aerated plastic fat mixed in with the dry mix and the aqueous medium to form the batter. The aerated plastic fat appears to provide a stable dispersion of gas nuclei in the batter.

These nuclei assist in providing a uniform distribution of gas bubbles throughout the batter as the leavening system and steam expand their volume upon heating. An aerated fat having about a 175 to 225% overrun, which has a volume of approximately 2½ to 3 times its non-aerated volume, suitably may be employed. Other degrees of aeration may be employed, as desired.

Suitable plastic fats which may be used preferably are those with relatively flat SFI profiles, preferably a profile of about 18 to 24% solids at 50° F. and about 6 to 12% solids at 105° F. One suitable plastic fat which may be used is non-emulsified "Crisco" brand all purpose shortening. It is most desirable for the plastic fat to be in its β' form, since the β' plastic form allows for most effective and stable aeration.

The quantity of aerated plastic fat which is employed in the dry mix varies from about 2 to about 15 wt % of the dry mix, preferably from about 3 to about 8 wt %.

An alternative component which may be added to provide a stabilized network of well-distributed, uniformly-sized gas bubbles is an emulsified plastic fat. An additional alternative is to provide the aerated plastic fat in an emulsified form. While many different emulsifiers are available, we have found that stearic and oleic polyglycerol esters, mainly of di-, tri- and tetra-glycerol length, lead to a desirable combination of a significant reduction in shelling and batter viscosity and a final batter texture which is crisp and short and a light and dry interface. Other emulsifiers tested, including mono- and di-glycerides, polysorbate 60, acid esters of mono- and di-glycerides, propylene glycol monoesters and sorbitan monostearate, which provide some variation in the properties of the batter, did not provide the desirable combination of improvements seen by employing the polyglycerol esters.

Where the plastic fat is emulsified, or where the plastic, emulsified fat is heated to about 40° C. to achieve a semi-melted pourable mixture, without significant destruction of the β' crystal structure, the semi-melted plastic, emulsified fat may have the characteristics described above for the aerated fat.

The quantity of emulsified plastic fat used is generally less than about 15 wt % of the dry mix, preferably about 3 to about 8 wt %. The quantity of polyglycerol ester present in the emulsified plastic fat generally is up to about 10 wt %, preferably about 0.2 to about 0.3 wt %, of the dry mix.

The dry tempura batter mix provided in accordance with the invention is suspended in water along with dispersion of the plastic fat therein to form a batter for application to the food substrate coated with the primer. In general, the weight ratio of water to batter dry blend components and plastic fat (shortening) is used to provide a target viscosity. Such target viscosity generally varies from about 1500 to about 5000 cps, preferably about 2800 to about 3800 cps. Total coating pick-up values will vary depending upon substrate; desired levels to achieve finished product attributes and legal limitations for standardized foodstuffs. Coating contribution can typically range from about 20 to about 60 wt % of the coated product, but was found most desirable at about 40 to about 50 wt %.

The presence of at least one gum in the batter mix tends to increase the cold water viscosity of the batter, thereby enabling the batter mix to be diluted and still provide the target viscosity. In general, about 1 wt % or less of gum is added. A gelatinizing gum, such as methylcellulose, is preferable and may be used to assist in stabilizing batter shell expansion during processing and in the case of the full-fry application, reduce frosting potential.

EXAMPLES

A series of experiments was carried out using a variety of batter compositions and the results tested. In each case, 1 oz. (28g) triangular-shaped frozen fish fillet portions were treated. Some of the portions were dipped in hot water to deglaze the surface. In Examples 1 to 7, a fine granular, low gelatinized predust of less than 40 mesh particle size (Krusto Breading 888SF) was applied to the deglazed, modified starch adhesion batter dipped portions to a total pick up of about 10 to 15 wt % of the total coating. In Examples 8 to 11, the predust was more porous and granular in nature (Krusto Breading 8011 and 888 SF blend) with a top screen of 16 mesh particle size.

Three different adhesion batters were employed, as set forth in the following Table I:

TABLE I

| INGREDIENT | ADHESION BATTER (wt %) | | |
|---|---|---|---|
| | 1 | 2 | 3 |
| XANTHAN GUM | 0.15% | 0 | 0 |
| SALT | 5.00 | 7.60 | 5.0 |
| CORN STARCH, AMAIZO 2658F - BATTER TEX | 79.85 | 33.0 | — |
| CORN STARCH, NATIVE | — | 30.00 | — |
| CORN STARCH, MODIFIED | — | — | 65.0 |
| FLOUR, HARD WHEAT | 5.00 | — | — |
| FLOUR, SOFT WHEAT | — | 15.00 | 15.0 |
| FLOUR, YELLOW CORN | 10.00 | 15.00 | 15.0 |
| DILUTION (SOLIDS:WATER) | 10:16–18 | 10:16–18 | 10:14–16 |

The Adhesion Batter mix 1 was used in Examples 1 to 6 while Adhesion Batter mix 2 was used in Example 7. Adhesion batter mix 3 was used in Examples 8 to 11.

The precoated fish portions then were dipped into the tempura batter, excess batter allowed to drain and the substrate and coating par fried at 380° to 390° F. for 35 to 40 seconds, then frozen and allowed to equilibrate for at least 24 hours. The frozen product in Examples 1 to 7 then was oven cooked by baking at 425° F. for 12 minutes on one side, turned and then baked for a further 8 minutes. The frozen product of Examples 8 to 11 was fully fried at 355° to 365° F. for 4.5 to 5.5 minutes. The products were then evaluated.

Different groups of the series of experiments explored various aspects of the batter composition.

Example 1

This Example describes the effect of variation of the components and amounts of the leavening system.

A leavening system comprising sodium acid pyrophosphate (SAPP), monocalcium acid phosphate, sodium bicarbonate and calcium lactate was used to vary properties of a tempura batter composition. The following Table II provides identification of the components and their proportions in the batter mix:

TABLE II

| INGREDIENTS | LEAVENING | | | | | |
|---|---|---|---|---|---|---|
| | Lea-0 | Lea-1 | Lea-2 | Lea-3 | Lea-4 | Lea-5 |
| Water | 107.5 | 107.5 | 107.5 | 107.5 | 107.5 | 107.5 |
| Shortening - Aerated Crisco All Purpose Professional | 7.5 | 7.5 | 7.5 | 7.5 | 7.5 | 7.5 |
| Batter Base Blend | 92.5 | 92.5 | 92.5 | 92.5 | 92.5 | 92.5 |
| BATTER BASE | | | | | | |
| Soft Wheat Flour | 70.0 | 68.785 | 67.570 | 68.175 | 68.215 | 68.815 |
| Wheat Starch - Native Whetstar | 16.775 | 16.775 | 16.775 | 16.775 | 16.775 | 16.775 |
| Salt, Fine Flake | 3.2 | 3.2 | 3.2 | 3.2 | 3.2 | 3.2 |
| Sugar, Powdered | 2.2 | 2.2 | 2.2 | 2.2 | 2.2 | 2.2 |

TABLE II-continued

|  | LEAVENING | | | | | |
| --- | --- | --- | --- | --- | --- | --- |
| INGREDIENTS | Lea-0 | Lea-1 | Lea-2 | Lea-3 | Lea-4 | Lea-5 |
| Dextrose | 3.2 | 3.2 | 3.2 | 3.2 | 3.2 | 3.2 |
| Supro 515 Gelling Soya Isolate | 3.2 | 3.2 | 3.2 | 3.2 | 3.2 | 3.2 |
| Sodium Acid Pyrophosphate #28 | 0.750 | 0.750 | 0.750 | 1.810 | 1.565 | 1.000 |
| Monocalcium Acid Phosphate Monohydrate | — | 0.675 | 1.350 | 0.240 | 0.460 | 0.460 |
| Sodium Bicarbonate Grade 2 | 0.540 | 1.080 | 1.620 | 1.080 | 1.080 | 1.080 |
| Calcium Lactate | 0.135 | 0.135 | 0.135 | 0.120 | 0.105 | 0.070 |

In these experiments, the dry batter mix, aerated 5 plastic fat and water were blended to a viscosity of about 2700 to 3100 cps. Target levels of sodium bicarbonate, MCP and calcium lactate, resulting in a good balance between processing, textural and visual characteristics were determined for this aerated plastic fat batter system. Also in these experiments, it was found that the use of excess SAPP (LEA 3, LEA 4) improved texture. The best result in terms of texture, coloration and reduced shelling was obtained by composition LEA4. Further adjustments to optimize the leavening system for improved processing, texture, appearance and flavour were made in subsequent trials.

Example 2

This Example describes the effect of variation of the amount and type of protein additive.

Protein, namely egg albumin, a gelling soya isolate and a non-gelling isolate, were incorporated into a tempura batter composition in varying quantity. The following Table III provides identification of the components and their proportions in the batter mix:

In these experiments, the dry batter mix, aerated plastic fat and water were blended to a viscosity of about 2300 to 2600 cps. Results with egg albumin, at equivalent protein levels to the soya isolates, were poor for stabilizing the cereal matrix and enrobing properties. The effects of the presence and absence of the soya isolate proteins and their relative amounts are summarized in the following Table IV:

TABLE IV

| PROTEIN | PROCESSING AFFECTS | TEXTURAL AFFECTS |
| --- | --- | --- |
| Gelling Isolate | Increases CWV Stabilizes batter matrix and cellular network Improves enrobing qualities Helps to reduce undesirable puffing/blistering/ballooning | Reduces interface heaviness/wetness Slightly enhances crispness and persistence of crispness |
| Non-Gelling Isolate | Slightly increases CWV Does not stabilize batter or cellular network | Significantly enhances batter crispness and persistence of crispness Does not reduce interface heaviness/wetness |
| Gelling: Non- | As ratio increases, stability | As ratio decreases, |

TABLE III

|  | PROTEIN | | | | | | | | | | | |
| --- | --- | --- | --- | --- | --- | --- | --- | --- | --- | --- | --- | --- |
| INGREDIENTS | Pro-1 | Pro-2 | Pro-O | Pro-3 | Pro-4 | Pro-5 | Pro-6 | Pro-7 | Pro-8 | Pro-9 | Pro-10 | Pro-11 |
| Water | 104 | 104 | 104 | 104 | 104 | 106 | 106 | 106 | 106 | 100 | 100 | 100 |
| Shortening-Aerated Crisco All-Purpose Professional | 7.5 | 7.5 | 7.5 | 7.5 | 7.5 | 7.5 | 7.5 | 7.5 | 7.5 | 7.5 | 7.5 | 7.5 |
| Batter Base Blend | 92.5 | 92.5 | 92.5 | 92.5 | 92.5 | 92.5 | 92.5 | 92.5 | 92.5 | 92.5 | 92.5 | 92.5 |
| BATTER BASE | | | | | | | | | | | | |
| Soft Wheat Flour | 68.093 | 68.693 | 68.193 | 69.793 | 68.293 | 69.793 | 68.193 | 68.193 | 68.193 | 69.793 | 69.793 | 69.793 |
| Wheat Starch - Native (Whetstar) | 17.975 | 17.975 | 17.975 | 17.975 | 17.975 | 17.915 | 17.975 | 17.975 | 17.975 | 17.915 | 17.975 | 17.975 |
| Salt, Fine Flake | 3.2 | 3.2 | 3.2 | 3.2 | 3.2 | 3.2 | 3.2 | 3.2 | 3.2 | 3.2 | 3.2 | 3.2 |
| Sugar, Powdered | 2.2 | 2.2 | 2.2 | 2.2 | 2.2 | 2.2 | 2.2 | 2.2 | 2.2 | 2.2 | 2.2 | 2.2 |
| Dextrose | 2.0 | 2.0 | 2.0 | 2.0 | 2.0 | 2.0 | 2.0 | 2.0 | 2.0 | 2.0 | 2.0 | 2.0 |
| Egg Albumin | 3.3 | 1.7 | — | — | — | — | — | — | — | — | — | — |
| Supro 515 Gelling Soya Isolate | — | — | 3.2 | 1.6 | — | — | 2.2 | 1.6 | 1.0 | 1.1 | 0.8 | 0.5 |
| Supro 516 Non-Gelling Isolate | — | — | — | — | 3.1 | 1.6 | 1.0 | 1.6 | 2.2 | 0.5 | 0.8 | 1.1 |
| Sodium Acid Pyrophosphate #28 | 1.690 | 1.690 | 1.690 | 1.690 | 1.690 | 1.690 | 1.690 | 1.690 | 1.690 | 1.690 | 1.690 | 1.690 |
| Monocalcium Acid Phosphate | 0.350 | 0.350 | 0.350 | 0.350 | 0.350 | 0.350 | 0.350 | 0.350 | 0.350 | 0.350 | 0.350 | 0.350 |
| Sodium Bicarbonate #2 | 1.080 | 1.080 | 1.080 | 1.080 | 1.080 | 1.080 | 1.080 | 1.080 | 1.080 | 1.080 | 1.080 | 1.080 |
| Calcium Lactate | 0.112 | 0.112 | 0.112 | 0.112 | 0.112 | 0.112 | 0.112 | 0.112 | 0.112 | 0.112 | 0.112 | 0.112 |

TABLE IV-continued

| PROTEIN | PROCESSING AFFECTS | TEXTURAL AFFECTS |
|---|---|---|
| Gelling Ratio | increases | crispness increases to a maximum at 1:1 and then levels off Interface heaviness/wetness and batter cohesiveness/toughness increases as ratio decreases |
| Total Level | Batter stability is improved at the 3.0% level vs 1.5% Increased CWV occurs at the higher level | Regardless of total level, crispness is maximized at a 1:1 ratio. Interface qualities have shown slight improvement at the higher usage level Slight edge in crispness is seen at the 3.0% level vs 1.5% |

In addition, experiments were carried out in which the effect of the presence of sodium caseinate in place of the non-gelling soya isolate was tested. The dry batter mix, aerated emulsified plastic fat and water were blended to a viscosity of about 2000 to 2700 cps. The experiments as outlined in Table V, which provides identification of the components and their proportions in the batter mix, showed that sodium caseinate enhances crispness over that obtained with non-gelling isolate; however, the cereal matrix stabilization is compromised. As sodium caseinate levels increase, crispness increases. Stability decreases and batter fragility increases as non-gelling soya isolate is replaced with sodium caseinate. A balance in characteristics was achieved with batter base LL.

TABLE V

| INGREDIENTS | PROTEIN TRIALS | | | | | |
|---|---|---|---|---|---|---|
| Water | 100 | 100 | 105 | 100 | 100 | 104 |
| Shortening - Aerated, Emulsified Crisco All Purpose Professional | 7.50 | 7.50 | 7.50 | 7.50 | 7.50 | 7.50 |
| Batter Base Blend | 92.50 | 92.50 | 92.50 | 92.50 | 92.50 | 92.50 |
| BATTER BASE | PA | PB | PC | GG | HH | LL |
| Soft Wheat Flour | 67.42 | 66.92 | 76.42 | 64.72 | 64.72 | 70.52 |
| Wheat Starch - Native (Whetstar) | 5.0 | 5.0 | — | 10.8 | 10.8 | 7.6 |
| Cornstarch - Modified (Crisp Coat M.C. - National) | 15.0 | 15.0 | 10.0 | 10.8 | 10.8 | 8.6 |
| Salt, Fine Flake | 3.2 | 3.2 | 3.2 | 3.2 | 3.2 | 3.2 |
| Sugar, Powdered | 2.2 | 2.2 | 2.2 | 2.2 | 2.2 | 2.2 |
| Dextrose | 2.0 | 2.0 | 2.0 | 2.0 | 2.0 | 1.6 |
| Gelling Soya Isolate (Supro 515) | 1.6 | 1.6 | 1.6 | 1.6 | 1.6 | 1.6 |
| Non Gelling Soya Isolate (Supro 516) | — | — | — | 1.6 | 0.5 | 1.1 |
| Sodium Caseinate (Alanate 191) | 0.5 | 1.0 | 1.5 | — | 1.1 | 0.5 |
| Sodium Acid Pyrophosphate #28 | 1.55 | 1.55 | 1.55 | 1.55 | 1.55 | 1.55 |
| Monocalcium Acid Phosphate | 0.35 | 0.35 | 0.35 | 0.35 | 0.35 | 0.35 |
| Sodium Bicarbonate Grade 2 | 1.08 | 1.08 | 1.08 | 1.08 | 1.08 | 1.08 |
| Calcium Lactate | 0.10 | 0.10 | 0.10 | 0.10 | 0.10 | 0.10 |

Example 3

This Example describes the effect of variation of the identity of emulsifier for aerated plastic fat.

A series of experiments was carried out in which various emulsifiers were tested for their aeration, dispersion and emulsification properties on a plastic fat and the effects of this emulsified, aerated fat in a tempura batter mix as compared to the non-emulsified aerated plastic fat. The results obtained are shown in the following Table VI:

TABLE VI

| | | CHARACTERISTICS COMPARED TO NON-EMULSIFIED FAT | | | |
|---|---|---|---|---|---|
| EMULSIFIER | HLB SCALE | FAT AERATION | BATTER DENSITY | BATTER HANDLING | BATTER TEXTURE |
| mono & di-glycerides | | | | | |
| less saturated | 2.5–3.5 | best of M&D | no change | less shelling | tougher/coh[1] heavier/wet IF[2] |

TABLE VI-continued

CHARACTERISTICS COMPARED TO NON-EMULSIFIED FAT

| EMULSIFIER | HLB SCALE | FAT AERATION | BATTER DENSITY | BATTER HANDLING | BATTER TEXTURE |
|---|---|---|---|---|---|
| more saturated | | Improved | no change | no change | crisper/shorter lighter/drier IF |
| polyglycerol esters (mainly di, tri & tetra glycerol) | 7.0–7.5 | no change | no change | significant reduction in shelling and batter viscosity | crisp & short light & dry interface |
| polysorbate 60 | 14.8–15. | improved | improved | no change | very crisp/short light & dry interface |
| acid esters of M&D (acetyl, datem, lactic and SSL) | 6–7 | amongst the better aerators | significant improvement except for datem | magnified shelling problems | ranges from crisp/short to non-distinct heavier/wetter IF |
| propylene glycol monoesters | 2–4 | much improved | very significant reduction | severe shelling attributes | thin crisp shell heavier/wetter IF |
| sorbitan mono-stearate | 4.5–5 | no change | slight improvement | significant reduction in shelling | no crispness heavy dense IF |

(1)Coh = cohesive
(2)IF = interface layer

These experiments showed that the polyglycerol esters, although not effecting fat aeration or batter density, gave significantly improved batter handling properties and excellent tempura textural qualities. Trials to combine the best properties of the mono and diglycerides, polysorbate 60, propylene glycol monoesters and polyglycerol esters showed some synergistic effects, but the most significant handling and textural improvements were still achieved with the polyglycerol esters on their own.

Example 4

This Example describes the effects of variation in the cereal components of the composition. The dry batter mix, aerated emulsified plastic fat and water were blended to a viscosity of about 2000 to 3400 cps in trials Cl to CK as outlined in Table VII below. In trials EE, HH and LL, the aerated emulsified fat was blended with the dry batter components and the complete dry blend was then hydrated with water to a viscosity of about 2300 to 2700 cps. Variations in the cereals were effected, as outlined in the following Table VII:

TABLE VII

| INGREDIENTS | CEREAL TRIALS | | | | | | | | | | | |
|---|---|---|---|---|---|---|---|---|---|---|---|---|
| Water | 107 | 110 | 100 | 100 | 100 | 100 | 100 | 100 | 100 | 100 | 103 | 100 |
| Shortening-Aerated, Emulsified Crisco All Purpose Professional | 7.50 | 7.50 | 7.50 | 7.50 | 7.50 | 7.50 | 7.50 | 7.50 | 7.50 | 7.50 | 7.50 | 7.50 |
| Batter Base Blend | 92.50 | 92.50 | 92.50 | 92.50 | 92.50 | 92.50 | 92.50 | 92.50 | 92.50 | 92.50 | 92.50 | 92.50 |
| BATTER BASE | C1 | C2 | CA | CB | CC | CD | CE | CF | CG | CH | CI | CJ |
| Soft Wheat Flour | 68.168 | 34.168 | 66.168 | 66.168 | 66.168 | 66.168 | 66.168 | 66.168 | 66.168 | 66.168 | 66.32 | 66.32 |
| Hard Wheat Flour | | 34.00 | | | | | | | | | | |
| Wheat Starch - Native (Whetster) | 18.00 | 28.00 | 20.0 | 10.0 | 10.0 | 10.0 | 10.0 | 5.0 | 5.0 | 5.0 | 5.0 | — |
| Wheat Starch - Modified (Midsol Krisp) | | | | 10.0 | | | | | | | | |
| Modified Potato Starch (Perfectamyl AC75) | | | | | 10.0 | | | | | | | |
| Modified Corn Starch (Crisp tax) | | | | | | 10.0 | | | | | | |
| Modified Corn Starch (Crisp Coat MC) | | | | | | | 10.0 | | | | 15.0 | 20.0 |
| BATTER BASE | | | CA | CB | CC | CD | CE | CF | CG | CH | CI | CJ |
| Rice Flour - Native (Comet L0080) | | | | | | | | | 15.0 | | | |
| Corn Flour White | | | | | | | | | | 15.0 | | |
| Corn Flour Yellow | | | | | | | | | | | 15.0 | |
| Salt, Fine Flake | 3.20 | 3.20 | 3.2 | 3.2 | 3.2 | 3.2 | 3.2 | 3.2 | 3.2 | 3.2 | 3.2 | 3.2 |
| Sugar, Powdered | 2.20 | 2.20 | 2.2 | 2.2 | 2.2 | 2.2 | 2.2 | 2.2 | 2.2 | 2.2 | 2.2 | 2.2 |
| Dextrose | 2.00 | 2.00 | 2.00 | 2.0 | 2.0 | 2.0 | 2.0 | 2.0 | 2.0 | 2.0 | 2.0 | 2.0 |
| Gelling Soya Isolate (Supro 515) | 1.60 | 1.60 | 1.6 | 1.6 | 1.6 | 1.6 | 1.6 | 1.6 | 1.6 | 1.6 | 1.6 | 1.6 |

TABLE VII-continued

| | | | | | | | | | | | | |
|---|---|---|---|---|---|---|---|---|---|---|---|---|
| Non-Gelling Isolate (Supro 516) | 1.60 | 1.60 | 1.6 | 1.6 | 1.6 | 1.6 | 1.6 | 1.6 | 1.6 | 1.6 | 1.6 | 1.6 |
| Sodium Caseinate (Alanate 191) | — | — | — | — | — | — | — | — | — | — | — | — |
| Sodium Acid Pyrophosphate #28 | 1.690 | 1.690 | 1.690 | 1.69 | 1.69 | 1.69 | 1.69 | 1.69 | 1.69 | 1.69 | 1.55 | 1.55 |
| Monocalcium Acid Phosphate | 0.350 | 0.350 | 0.35 | 0.35 | 0.35 | 0.35 | 0.35 | 0.35 | 0.35 | 0.35 | 0.35 | 0.35 |
| Sodium Bicarbonate Grade 2 | 1.080 | 1.080 | 1.08 | 1.08 | 1.08 | 1.08 | 1.08 | 1.08 | 1.08 | 1.08 | 1.08 | 1.08 |
| Calcium Lactate | 0.112 | 0.112 | 0.112 | 0.112 | 0.112 | 0.112 | 0.112 | 0.112 | 0.112 | 0.112 | 0.10 | 0.10 |

| INGREDIENTS | CEREAL TRIALS | | | |
|---|---|---|---|---|
| Water | 108 | 103 | 100 | 104 |
| Shortening-Aerated, Emulsified Crisco All Purpose Professional | 7.50 | 7.50 | 7.50 | 7.50 |
| Batter Base Blend | 92.50 | 92.50 | 92.50 | 92.50 |
| BATTER BASE | CK | EE | HH | LL |
| Soft Wheat Flour | 86.32 | 75.52 | 64.72 | 70.52 |
| Hard Wheat Flour | | | | |
| Wheat Starch - Native (Whetster) | — | — | 10.8 | 7.6 |
| Wheat Starch - Modified (Midsol Krisp) | | | | |
| Modified Potato Starch (Perfectamyl AC75) | | | | |
| Modified Corn Starch (Crisp tax) | | | | |
| Modified Corn Starch (Crisp Coat MC) | — | 10.8 | 10.8 | 8.6 |
| BATTER BASE | CK | EE | HH | LL |
| Rice Flour - Native (Comet L0080) | | | | |
| Corn Flour White | | | | |
| Corn Flour Yellow | | | | |
| Salt, Fine Flake | 3.2 | 3.2 | 3.2 | 3.2 |
| Sugar, Powdered | 2.2 | 2.2 | 2.2 | 2.2 |
| Dextrose | 2.0 | 2.0 | 2.0 | 1.8 |
| Gelling Soya Isolate (Supro 515) | 1.6 | 1.6 | 1.6 | 1.6 |
| Non-Gelling Isolate (Supro 516) | 1.6 | 0.5 | 0.5 | 1.1 |
| Sodium Caseinate (Alanate 191) | — | 1.1 | 1.1 | 0.5 |
| Sodium Acid Pyrophosphate #28 | 1.55 | 1.55 | 1.55 | 1.55 |
| Monocalcium Acid Phosphate | 0.35 | 0.35 | 0.35 | 0.35 |
| Sodium Bicarbonate Grade 2 | 1.08 | 1.08 | 1.08 | 1.08 |
| Calcium Lactate | 0.10 | 0.10 | 0.10 | 0.10 |

As the percentage of soft wheat flour or modified film forming corn starch (Crisp Coat M.C.) increased, the shelling/ballooning characteristic of the tempura coating accentuated. Addition of hard wheat flour also enhanced shelling. The shelling generally enhanced crispness of the cooked product, but also added cohesiveness/toughness, as well as, heavier/wetter interface qualities, to the coating. A balance between the lower wheat gluten flour, crispening film forming modified corn starch and native wheat starch filler is required to help provide a stable batter matrix. Poorer textural results were achieved with the other modified starches and alternate flours.

Example 5

This Example describes the presence of gums in the batter mix.

Various gums were added in varying amounts to the batter composition, in an attempt to stabilize the batter system. Two different base compositions were employed. In the compositions in Table VIIIA, the dry batter mix, aerated-emulsified plastic fat and water were blended to a viscosity of about 2500 to 3700 cps. Those compositions in Table VIIIB were manufactured as complete dry blends to which only water was added and blended to a viscosity of about 2300 to 2700 cps.

The compositions are shown in the following Tables VIIIA and VIIIB:

TABLE VIIIA

| INGREDIENTS | GUM TRIALS | |
|---|---|---|
| Water | 120 | 119 |
| Shortening - Aerated Emulsified Crisco Professional | 7.5 | 7.5 |
| Batter Base Blend | 92.5 | 92.5 |
| BATTER BASE | G1 | G2 |
| Soft Wheat Flour | 75.32 | 76.07 |
| Wheat Starch - Native (Whetstar) | — | — |
| Modified Corn Starch (Crisp Coat MC) | 10.00 | 10.00 |
| Methylcellulose (Methocel A4M) | 1.0 | 0.25 |
| Salt, Fine Flake | 3.2 | 3.2 |
| Sugar, Powdered | 2.2 | 2.2 |
| Dextrose | 2.0 | 2.0 |
| Gelling Soya Isolate (Supro 515) | 1.6 | 1.6 |
| Non-Gelling Isolate (Supro 516) | 1.6 | 1.6 |
| Sodium Caseinate (Alanate 191) | — | — |
| Sodium Acid Pyrophosphate #28 | 1.55 | 1.55 |
| Monocalcium Acid Phosphate | 0.35 | 0.35 |
| Sodium Bicarbonate Grade 2 | 1.08 | 1.08 |
| Calcium Lactate | 0.10 | 0.10 |

TABLE VIIIB

| INGREDIENTS | AA | BB | CC | DD | EE | II | JJ |
|---|---|---|---|---|---|---|---|
| WATER | 110 | 110 | 108 | 110 | 103 | 108 | 100 |
| BATTER BASE | 100 | 100 | 100 | 100 | 100 | 100 | 100 |
| SHORTENING - AERATED EMULSIFIED CRISCO PROFESSIONAL | 7.225 | 7.225 | 7.225 | 7.225 | 7.225 | 7.225 | 7.225 |
| POLYGLYCEROL ESTERS | 0.275 | 0.275 | 0.275 | 0.275 | 0.275 | 0.275 | 0.275 |
| METHYLCELLULOSE A.4M | 0.100 | 0.150 | — | — | — | 0.150 | — |
| METHYLCELLULOSE A15LV | — | — | 0.150 | 0.250 | — | — | 0.250 |
| WHEAT STARCH - NATIVE (WHETSTAR) | — | — | — | — | — | 10.000 | 10.000 |
| MODIFIED CORN STARCH (CRISP COAT MC) | 10.000 | 10.000 | 10.000 | 10.000 | 10.000 | 10.000 | 10.000 |
| SOFT WHEAT FLOUR | 69.750 | 69.700 | 69.700 | 69.600 | 69.850 | 59.700 | 59.600 |
| SALT, FINE FLAKE | 3.000 | 3.000 | 3.000 | 3.000 | 3.000 | 3.000 | 3.000 |
| SUGAR, POWDERED | 2.000 | 2.000 | 2.000 | 2.000 | 2.000 | 2.000 | 2.000 |
| DEXTROSE | 1.800 | 1.800 | 1.800 | 1.800 | 1.800 | 1.800 | 1.800 |
| GELLING SOYA ISOLATE (SUPRO 515) | 1.500 | 1.500 | 1.500 | 1.500 | 1.500 | 1.500 | 1.500 |
| NON-GELLING SOYA ISOLATE (SUPRO 516) | 0.500 | 0.500 | 0.500 | 0.500 | 0.500 | 0.500 | 0.500 |
| SODIUM CASEINATE (ALANATE 191) | 1.000 | 1.000 | 1.000 | 1.000 | 1.000 | 1.000 | 1.000 |
| SODIUM ACID PYROPHOSPHATE #28 | 1.430 | 1.430 | 1.430 | 1.430 | 1.430 | 1.430 | 1.430 |
| MONOCALCIUM ACID SULPHATE | 0.325 | 0.325 | 0.325 | 0.325 | 0.325 | 0.325 | 0.325 |
| SODIUM BICARBONATE GRADE 2 | 1.000 | 1.000 | 1.000 | 1.000 | 1.000 | 1.000 | 1.000 |
| CALCIUM LACTATE | 0.095 | 0.095 | 0.095 | 0.095 | 0.095 | 0.095 | 0.095 |

The gelling gum methylcellulose, improved processing stability of this emulsified plastic fat tempura system, but also increased the requirement for water of hydration in order to achieve a desirable viscosity. This lower solids batter resulted in an oilier par-fried product. Additional gum also enhanced the formation of the undesirable shell structure which lead to increased coating cohesiveness and poorer interface qualities. This result was quite evident with the use of non-gelatinizing gums, such as xanthan. Low viscosity methylcellulose gum A15LV at a level less than about 0.25 wt % can be used to stabilize the batter system without significant negative textural results.

Example 6

This Example describes the effects of varying the emulsified plastic fat level in the batter system.

Varying levels of emulsified plastic fat were incorporated into the batter composition. In these experiments, the dry batter mix, emulsified plastic fat and water were blended to a viscosity of about 2700 to 3100 cps in trials FA to FD and about 2100 to 2800 cps in trials FE to FF. Table IX below provides identification of the fat and dry base blend levels in the batter mix:

In Trials FA to FD, as total fat increased in the batter mix, crispness improved, cohesiveness/toughness diminished and interface heaviness/wetness/pastiness was significantly reduced. However, with an increase in emulsified plastic fat, coating fragility and batter viscosity increased. As the emulsifier level is increased, plastic fat levels can be decreased to achieve similar desirable textural qualities as with the higher fat levels containing less emulsifier, but without the fragility and processing problems experienced with the latter.

Example 7

This Example describes the application of tempura batter mixes to a pilot line continuous frying operation.

The experiments described in the preceding Examples were carried out using a lab scale static par-fry operation. Several complete dry blend tempura mixes, i.e. containing the emulsified fats as outlined in Table X below, were hydrated with cold water; mixed on a bench-top kitchen aid mixer to a viscosity of about 2600 to 3400 cps; applied by hand to predusted fish portions and then passed through a pilot scale continuous fryer at about 385° to 395° F. for about 28 to 32 seconds. The compositions are shown in Table X:

TABLE IX

| INGREDIENTS | PLASTIC FAT LEVEL TRIALS | | | | | |
|---|---|---|---|---|---|---|
| Water | 100 | 100 | 100 | 100 | 100 | 105 |
| Shortening - Emulsified Crisco All Purpose Professional | 5.00 | 10.00 | 15.00 | 20.00 | 7.5 | 7.5 |
| Batter Base Blend | 95.00 | 90.00 | 85.00 | 80.00 | 92.5 | 92.5 |
| BATTER BASE | FA | FB | FC | FD | FE | FF |
| Soft Wheat Flour | 66.168 | 66.168 | 66.168 | 66.168 | 66.168 | 66.168 |
| Wheat Starch - Native (Whetstar) | 12.0 | 12.0 | 12.0 | 12.0 | 12.0 | 12.0 |
| Cornstarch - Modified (Crisp Coat M.C. - National) | 8.0 | 8.0 | 8.0 | 8.0 | 8.0 | 8.0 |
| Salt, Fine Flake | 3.2 | 3.2 | 3.2 | 3.2 | 3.2 | 3.2 |
| Sugar, Powdered | 2.2 | 2.2 | 2.2 | 2.2 | 2.2 | 2.2 |
| Dextrose | 2.0 | 2.0 | 2.0 | 2.0 | 2.0 | 2.0 |
| Gelling Soya Isolate (Supro 515) | 1.6 | 1.6 | 1.6 | 1.6 | 1.6 | 1.6 |
| Non Gelling Soya Isolate (Supro 516) | 1.6 | 1.6 | 1.6 | 1.6 | 1.6 | 1.6 |
| Sodium Acid Pyrophosphate #28 | 1.69 | 1.69 | 1.55 | 1.69 | 1.69 | 1.69 |
| Monocalcium Acid Phosphate | 0.35 | 0.35 | 0.35 | 0.35 | 0.35 | 0.35 |
| Sodium Bicarbonate Grade 2 | 1.08 | 1.08 | 1.08 | 1.08 | 1.08 | 1.08 |
| Calcium Lactate | 0.112 | 0.112 | 0.112 | 0.112 | 0.112 | 0.112 |

Polyglycerol ester emulsifier was kept constant at 0.2% in trials FA–FD and at 0.3% in trials FE–FF.

TABLE X

| INGREDIENTS Batter, Complete Dry Blend | LL0 | LL6 | LL8 | LL9 |
|---|---|---|---|---|
| Water | 104 | 104 | 102 | 100 |
| Polyglycerol Esters - Stearate Base | 0.275 | — | 0.275 | 0.275 |
| Polyglycerol Esters - Oleate Base | — | 0.275 | — | — |
| Shortening, Crisco All-Purpose Professional | 7.225 | 7.225 | — | — |
| Shortening, CVS Confectionary Bulk Liquid | — | — | 7.225 | — |
| Oil, Soyabean | — | — | — | 7.225 |
| Wheat Starch - Native (Whetstar) | 7.00 | 7.00 | 7.00 | 7.00 |
| Modified Corn Starch (Crisp Coat MC) | 8.00 | 8.00 | 8.00 | 8.00 |
| Soft Wheat Flour | 65.15 | 65.15 | 65.15 | 65.15 |
| Salt, Dairy | 3.00 | 3.00 | 3.00 | 3.00 |
| Sugar Cane - Fine | 2.00 | 2.00 | 2.00 | 2.00 |
| Dextrose | 1.50 | 1.50 | 1.50 | 1.50 |
| Gelling Soya Protein Isolate (Supro 515) | 1.50 | 1.50 | 1.50 | 1.50 |
| Non-Gelling Soya Protein Isolate (Supro 516) | 1.00 | 1.00 | 1.00 | 1.00 |
| Sodium Caseinate (Alanate 191) | 0.50 | 0.50 | 0.50 | 0.50 |
| Sodium Acid Pyrophosphate #28 | 1.430 | 1.430 | 1.430 | 1.430 |
| Monocalcium Acid Phosphate | 0.325 | 0.325 | 0.325 | 0.325 |
| Sodium Bicarbonate Grade #2 | 1.000 | 1.000 | 1.000 | 1.000 |
| Calcium Lactate | 0.095 | 0.095 | 0.095 | 0.095 |

In the series of complete dry blend trials using emulsified Crisco fat, it was once again confirmed that destruction of the β' crystal structure, caused by high temperatures of 65° to 75° C. required to melt the predominantly stearate based polyglycerol esters, resulted in increased shelling, reduced crispness, increased cohesiveness and heavier interface qualities. Product oiliness, especially on oven cook is more evident. Liquid, emulsified confectionary type fat, or emulsified oil, give even poorer overall processing and/or finished product results. This shows that fat composition and structure are important to achieve desirable qualities.

The polyglycerol esters of oleate based fats resulted in softer, emulsified blends when compared to stearate based ones. The softer blends gave a more fragile par-fried surface and a more tender crispness when compared to the harder stearate blend. Therefore, a wide range of finished product texture is achievable when the polyglycerol esters are blended.

The preferred fat in this invention is the fully aerated, emulsified plastic fat with a Crisco SFI type of profile in trial LL0. However, even with minimal fat aeration, also based on the formula of LL0 of Table X, in which case 25% of the plastic fat was heated to 75° C. and blended with the predominantly stearate based polyglycerol esters to achieve complete melt of this solid emulsifier; this hot blend then added to the remaining plastic fat at room temperature and brought to 40° C. to achieve a pourable consistency; this mixture poured onto the remaining dry components and blended to homogeneity, the resulting processing and finished product characteristics were similar to those achieved with the preferred fat.

Similar results are achieved when the stearate based polyglycerol esters are heated to about 70° to 80° C. in vegetable oil at a preferred ratio of 1 part emulsifier to 3 parts oil. This hot blend then is plated onto a granular material, such as salt, sugar and/or dextrose, dried with wheat flour or starch and then added to the remaining components, separate of the plastic fat. All components, including plastic fat, then are blended to homogeneity.

Example 8

This Example describes the effect of colorant addition to a complete food service dry batter mix.

Various types of coloring agents were incorporated into the composition. The dry batter was blended with water to a viscosity of about 4000 to 4200 cps. Table XI below identifies the colorants in the batter mix:

TABLE XI

| BATTER BASE | FSA | FSB | FSC |
|---|---|---|---|
| Shortening - Crisco All Purpose Professional | 5.00 | 5.00 | 5.00 |
| Annatto Food Colour | | | 0.03 |
| Oleoresin Paprika | | 0.03 | |
| Oleoresin Turmeric | 0.03 | | |
| Sodium Acid Pyrophosphate #28 | 0.86 | 0.86 | 0.86 |
| Monocalcium Acid Phosphate Monohydrate | 0.20 | 0.20 | 0.20 |
| Calcium Lactate | 0.06 | 0.06 | 0.06 |
| Sodium Bicarbonate #2 | 0.60 | 0.60 | 0.60 |
| Salt | 4.00 | 4.00 | 4.00 |
| Gum, Guar | 0.25 | 0.25 | 0.25 |
| Gum, Methylcellulose | | | |
| Soft Wheat Flour | 28.00 | 28.00 | 28.00 |
| Yellow Corn Flour | 28.00 | 28.00 | 28.00 |
| Soya Flour Defatted | 5.00 | 5.00 | 5.00 |
| Corn Starch, Native | 20.00 | 20.00 | 20.00 |
| Wheat Starch, Native (Whetstar) | | | |
| Cornstarch, Modified (Crisp Coat MC) | 8.00 | 8.00 | 8.00 |
| Batter Base Blend | 100 | 100 | 100 |
| Water | 110 | 110 | 110 |

In this set of experiments, a typical full-fry batter cereal base was employed and soy flour was used as the additional protein source. The frosting phenomenon, enhanced mainly by the shortening and soy isolates, was partially masked with the additional colorant. The best results were obtained with annatto food colour, resulting in a fry tolerant, golden-toasted, brown-toned fully fried product. Both oleoresin paprika and turmeric were not as effective and the fully fried color was not as visually appealing.

Example 9

This Example describes the effect of varying the amount of shortening in the complete dry batter formulation.

The dry batter mix was blended with water to a viscosity of about 3600 to 4500 cps. The compositions are shown in Table XII as follows:

TABLE XII

| BATTER BASE | FSD | FSE | FSF | FSG |
|---|---|---|---|---|
| Shortening - Crisco All Purpose Professional | 5.00 | 3.00 | 2.00 | — |
| Partially Hydrogenated Soybean Oil | 0.675 | 0.675 | 0.675 | 0.675 |
| Polyglycerol Ester | 0.225 | 0.225 | 0.225 | 0.225 |
| Annatto Food Colour | 0.03 | 0.03 | 0.03 | 0.03 |
| Sodium Acid Pyrophosphate #28 | 0.86 | 0.86 | 0.86 | 0.86 |
| Monocalcium Acid Phosphate Monohydrate | 0.20 | 0.20 | 0.20 | 0.20 |
| Calcium Lactate | 0.06 | 0.06 | 0.06 | 0.06 |
| Sodium Bicarbonate #2 | 0.60 | 0.60 | 0.60 | 0.60 |
| Salt | 4.00 | 4.00 | 4.00 | 4.00 |
| Gum, Methylcellulose | 0.20 | 0.20 | 0.20 | 0.20 |
| Soft Wheat Flour | 28.00 | 28.00 | 28.00 | 28.00 |
| Yellow Corn Flour | 28.00 | 28.00 | 28.00 | 28.00 |
| Corn Starch, Native | 20.65 | 22.65 | 23.65 | 25.65 |
| Cornstarch, Modified (Crisp Coat MC) | 8.00 | 8.00 | 8.00 | 8.00 |

TABLE XII-continued

| BATTER BASE | FSD | FSE | FSF | FSG |
|---|---|---|---|---|
| Gelling Soya Isolate (Supro 515) | 3.50 | 3.50 | 3.50 | 3.50 |
| Batter Base Blend | 100 | 100 | 100 | 100 |
| Water | 103 | 105 | 103 | 105 |

Frosting diminished as the level of shortening was decreased. At the 2.0% level, the underlying lacy appearance was eliminated, but the rougher surface ridges still exhibited some frosting. Textural qualities became unacceptable at shortening levels below the 3.0% mark. Increased toughness/cohesiveness was prevalent.

Example 10

This Example describes the effects of adding alternate starch, dextrins and maltodextrin to the dry composition.

In Table XIIIa below, the cereal blend is similar to that of Tables XI and XII, but in Table XIIIb below, changes in the wheat flour, corn flour and total starch components can also be seen. These changes culminate in the formulation as seen in Table XIV below and were necessary to achieve the desired textural qualities of this novel batter system. In the experiments identified in Table XIIIa, the complete dry batter mix was blended with water to a viscosity of about 3000 to 4000 cps.

TABLE XIIIa

| BATTER BASE | FSH | FSI | FSJ | FSK |
|---|---|---|---|---|
| Shortening - Crisco All Purpose Professional | 3.00 | 3.00 | 3.00 | 3.00 |
| Partially Hydrogenated Soybean Oil | 0.675 | 0.675 | 0.675 | 0.675 |
| Polyglycerol Ester | 0.225 | 0.225 | 0.225 | 0.225 |
| Annatto Food Colour | 0.03 | 0.03 | 0.03 | 0.03 |
| Sodium Acid Pyrophosphate #28 | 0.86 | 0.86 | 0.86 | 0.86 |
| Monocalcium Acid Phosphate Monohydrate | 0.20 | 0.20 | 0.20 | 0.20 |
| Calcium Lactate | 0.06 | 0.06 | 0.06 | 0.06 |
| Sodium Bicarbonate #2 | 0.60 | 0.60 | 0.60 | 0.60 |
| Salt | 4.00 | 4.00 | 4.00 | 4.00 |
| Gum, Guar | | | | |
| Gum, Methylcellulose | 0.20 | 0.20 | 0.20 | 0.20 |
| Soft Wheat Flour | 28.00 | 28.00 | 28.00 | 28.00 |
| Yellow Corn Flour | 28.00 | 28.00 | 28.00 | 28.00 |
| Soya Flour Defatted | | | | |
| Corn Starch, Native | 17.65 | 17.65 | 17.65 | 17.65 |
| Cornstarch, Modified (Crisp Coat MC) | 8.00 | 8.00 | 8.00 | 8.00 |
| Potato Dextrin (Avebe, B 1102) | 5.00 | | | |
| Corn Maltodextrin (Staley, Stardri I) | | 5.00 | | |
| Tapioca Dextrin (Staley, Tapioca II) | | | 5.00 | |
| Gelling Soya Isolate (Supro 515) | 3.50 | 3.50 | 3.50 | 3.50 |
| Potato Starch, Modified (Avebe AC75) | | | | 5.00 |
| Batter Base Blend | 100 | 100 | 100 | 100 |
| Water | 105 | 103 | 105 | 105 |

As a result of decreasing the shortening component to address frosting, textural qualities began to suffer as described in Example 9. To improve these textural qualities and further reduce frosting, dextrins and maltodextrin had a significant effect. Compared to product made with the composition of FSD in Table XII, replacing 5 wt % native corn starch with the potato and tapioca dextrins or corn maltodextrin, reduced the frosting by various degrees. Best visual improvement was obtained with potato and tapioca dextrins, while the corn maltodextrin resulted in better textural enhancement. Modified potato starch was least effective in improving either textural or visual qualities.

Formulations listed in Table XIIIb were blended with water to a viscosity of about 2600 to 4700 cps. This Table describes further dry blend variations with potato dextrins and maltodextrin, corn dextrins and tapioca dextrin.

TABLE XIIIb

| BATTER BASE | FSL | FSM | FSN | FSO | FSP | FSQ | FSR | FSS |
|---|---|---|---|---|---|---|---|---|
| Shortening - Crisco All Purpose Professional | 3.00 | 3.00 | 3.00 | 3.00 | 3.00 | 3.00 | 3.00 | 3.00 |
| Partially Hydrogenated Soybean Oil | 0.675 | 0.675 | 0.675 | 0.675 | 0.675 | 0.675 | 0.675 | 0.675 |
| Polyglycerol Ester | 0.225 | 0.225 | 0.225 | 0.225 | 0.225 | 0.225 | 0.225 | 0.225 |
| Annatto Food Colour | 0.03 | 0.03 | 0.03 | 0.03 | 0.03 | 0.03 | 0.03 | 0.03 |
| Sodium Acid Pyrophosphate #28 | 0.86 | 0.86 | 0.86 | 0.86 | 0.86 | 0.86 | 0.86 | 0.86 |
| Monocalcium Acid Phosphate Monohydrate | 0.20 | 0.20 | 0.20 | 0.20 | 0.20 | 0.20 | 0.20 | 0.20 |
| Calcium Lactate | 0.06 | 0.06 | 0.06 | 0.06 | 0.06 | 0.06 | 0.06 | 0.06 |
| Sodium Bicarbonate #2 | 0.60 | 0.60 | 0.60 | 0.60 | 0.60 | 0.60 | 0.60 | 0.60 |
| Salt | 4.00 | 4.00 | 4.00 | 4.00 | 4.00 | 4.00 | 4.00 | 4.00 |
| Gum, Methylcellulose | 0.20 | 0.20 | 0.20 | 0.20 | 0.20 | 0.20 | 0.20 | 0.20 |
| Soft Wheat Flour | 45.00 | 45.00 | 45.00 | 45.00 | 45.00 | 45.00 | 45.00 | 45.00 |
| Yellow Corn Flour | 15.00 | 15.00 | 15.00 | 15.00 | 15.00 | 15.00 | 15.00 | 15.00 |
| Corn Starch, Native | 13.65 | 13.65 | 13.65 | 13.65 | 13.65 | 13.65 | 13.65 | 13.65 |
| Cornstarch, Modified (Crisp Coat MC) | 8.00 | 8.00 | 8.00 | 8.00 | 8.00 | 8.00 | 8.00 | 8.00 |
| Tapioca Dextrin (Staley-Tapioca II) | | | | | | | | 5.00 |
| Potato Dextrin (Avebe B 1102) | 5.00 | | | | | | | |
| Potato Maltodextrin (Avebe, Paselli MD6) | | 5.00 | | | | | | |
| Potato Dextrin (Avebe - Avedex 36) | | | 5.00 | | | | | |
| Gelling Soya Isolate (Supro 515) | 3.50 | 3.50 | 3.50 | 3.50 | 3.50 | 3.50 | 3.50 | 3.50 |
| Potato Dextrin (Avebe - Avedex 56) | | | | | 5.00 | | | |
| Potato Dextrin (Avebe - Avedex 85) | | | | 5.00 | | | | |
| Corn Dextrin (Staley - Stadex 9) | | | | | | 5.00 | | |
| Corn Dextrin (Staley - Stadex 90) | | | | | | | 5.00 | |

TABLE XIIIb-continued

| BATTER BASE | FSL | FSM | FSN | FSO | FSP | FSQ | FSR | FSS |
|---|---|---|---|---|---|---|---|---|
| Batter Base Blend | 100 | 100 | 100 | 100 | 100 | 100 | 100 | 100 |
| Water | 105 | 105 | 105 | 105 | 105 | 105 | 105 | 105 |

In general, as the solubility of the dextrin increases (Avedex 36, 56, 85; Stadex 9, 90), textural improvement, especially in shortness or reduced cohesiveness, is observed. The full-fry color of the cooked product increases, but frosting potential appears to be independent of solubility. Blends of these dextrin and maltodextrin products were evaluated and a ratio of 3 parts soluble potato maltodextrin: 2 parts soluble corn dextrin gave overall best textural and appearance improvements. This blend was incorporated into the experiments listed in Table XIV.

Example 11

This Example describes the effect on frosting and texture with variation of the amount of methylcellulose incorporated into the dry blend.

In these experiments, the complete dry batter mix was blended with water to a viscosity of about 2800 to 4500 cps. Table XIV identifies the level of gum in the various experiments:

TABLE XIV

| BATTER BASE | FST | FSU | FSV | FSW | FSX |
|---|---|---|---|---|---|
| Shortening - Crisco All Purpose Professional | 3.00 | 3.00 | 3.00 | 3.00 | 3.00 |
| Partially Hydrogenated Soybean Oil | 0.825 | 0.825 | 0.825 | 0.825 | 0.825 |
| Polyglycerol Ester | 0.275 | 0.275 | 0.275 | 0.275 | 0.275 |
| Annatto Food Colour | 0.030 | 0.030 | 0.030 | 0.030 | 0.030 |
| Sodium Acid Pyrophosphate #28 | 0.86 | 0.86 | 0.86 | 0.86 | 0.86 |
| Monocalcium Acid Phosphate Monohydrate | 0.20 | 0.20 | 0.20 | 0.20 | 0.20 |
| Calcium Lactate | 0.06 | 0.06 | 0.06 | 0.06 | 0.06 |
| Sodium Bicarbonate #2 | 0.60 | 0.60 | 0.60 | 0.60 | 0.60 |
| Salt | 4.00 | 4.00 | 4.00 | 4.00 | 4.00 |
| Gum, Methylcellulose | 0.20 | 0.15 | 0.10 | 0.05 | 0.00 |
| Soft Wheat Flour | 50.00 | 50.05 | 50.10 | 50.15 | 50.20 |
| Wheat Starch, Native (Whetstar) | 23.45 | 23.45 | 23.45 | 23.45 | 23.45 |
| Cornstarch, Modified (Crisp Coat MC) | 8.00 | 8.00 | 8.00 | 8.00 | 8.00 |
| Potato Maltodextrin (Paselli MD6) | 3.00 | 3.00 | 3.00 | 3.00 | 3.00 |
| Corn Dextrin (Stadex 90) | 2.00 | 2.00 | 2.00 | 2.00 | 2.00 |
| Gelling Soya Isolate (Supro 515) | 3.50 | 3.50 | 3.50 | 3.50 | 3.50 |
| Batter Base Blend | 100 | 100 | 100 | 100 | 100 |
| Water | 98 | 98 | 98 | 98 | 98 |

In general, as the level of gum decreases, batter fluidity and instability increases resulting in an increased tendency for frosting. The interface layer does become drier and the texture shorter and non-cohesive in nature. An acceptable compromise is achieved at the 0.15 wt % level for methylcellulose in the complete dry blend.

SUMMARY OF THE DISCLOSURE

In summary of this disclosure, the present invention provides a novel tempura batter system. A careful selection of components and a balancing of the proportions of cereals, proteins, leavening system, fat and emulsifier, permits the attainment of effective gelatinization characteristics and a controlled formation of outer shell to provide improved organoleptic properties. Modifications are possible within the scope of this invention.

What we claim is:

1. A dry mix composition for the formation of batter applied to a foodstuff, comprising:
    (a) soft wheat flour in an amount of less than about 75 wt % of the composition,
    (b) total starches in an amount of about 15 to about 30 wt % of the composition, wherein unmodified starches comprise 0 to about 30 wt % of the composition and modified starches comprise 0 to about 30 wt % of the composition,
    (c) leavening agent in an amount of about 1 to about 5 wt % of the composition and comprising a combination of about 0.4 to about 1.5 wt. % of sodium bicarbonate, about 0.5 to about 2.2 wt. % of sodium acid pyrophosphate, about 0.1 to about 0.6 wt. % of monocalcium acid phosphate and about 0.03 to about 0.15 wt. % of calcium lactate, with sodium pyrophosphate being present in an excess of the amount up to about 50% of the amount required to neutralize the sodium bicarbonate not reacted with monocalcium acid phosphate, and
    (d) aerated or emulsified plastic fat in an amount of less than about 15 wt % of the composition.

2. The composition of claim 1 wherein said dry mix contains about 45 to about 65 wt % of soft wheat flour, about 15 to about 30 wt % total starches including about 5 to about 25 wt % of unmodified starches and about 5 to about 15 wt % of modified starches.

3. The composition of claim 1 wherein said monocalcium acid phosphate is present in an amount sufficient to neutralize about 15 to about 35 wt % of the sodium bicarbonate.

4. The composition of claim 1 wherein said leavening agents are present in the dry mix in the quantities:

| | |
|---|---|
| sodium bicarbonate | about 0.6 to about 1.2 wt % |
| sodium acid pyrophosphate | about 0.8 to about 1.7 wt % |
| monocalcium phosphate | about 0.2 to about 0.5 wt % |
| calcium lactate | about 0.06 to about 0.12 wt %. |

5. The composition of claim 1 further comprising up to about 3.5 wt % of proteins.

6. The composition of claim 1 wherein said plastic fat is used in an amount of from about 3 to about 8 wt %.

7. The composition of claim 1 wherein said plastic fat is aerated plastic fat having about a 175 to 225% overrun and has a volume of about 2.5 to 3 times its non-aerated volume.

8. The composition of claim 1 wherein said plastic fat has an SFI profile of about 18 to 24% solids at 50° F. and about 6 to 12% solids at 105° F.

9. The composition of claim 8 wherein said plastic fat is in its β' form.

10. The composition of claim 1 wherein said plastic fat is an emulsified plastic fat and is emulsified by a stearic or oleic polyglycerol ester present in the emulsified fat in an amount up to about 10 wt % of the composition.

11. The composition of claim 10 wherein said polyglycerol esters are present in the emulsified fat in an amount of about 0.2 to about 0.3 wt % of the composition.

12. An aqueous composition for application to a foodstuff, comprising a dry mix composition of claim 1 dispersed in water to provide a batter.

13. The batter composition of claim 12 wherein said batter has a viscosity of about 1500 to about 5000 cps.

14. The batter composition of claim 13 wherein said viscosity is about 2800 to about 3800 cps.

15. The batter composition of claim 13 further comprising at least one gum in an amount of about 1 wt % or less of the dry mix composition.

16. The batter composition of claim 15 wherein said gum is a gelatinizing gum.

17. A method of processing of a foodstuff, which comprises:

applying a first pass layer to said foodstuff, applying an aqueous batter composition as claimed in claim 13 to the foodstuff, par frying or fully frying the coated foodstuff to form a cooked batter coating on the foodstuff, and freezing the fried coated foodstuff.

18. The method of claim 17 wherein said first pass layer is an adhesion and/or cementing layer.

19. The method of claim 17 wherein said first pass layer is a fine particulate primer applied in an amount of which is less than about 15 wt % of the overall coating mass.

20. The method of claim 19 wherein said batter composition is applied to a total pickup providing a coating contribution of about 20 to about 60 wt % of the coated foodstuff.

21. The method of claim 20 wherein said coating contribution is about 40 to about 50 wt % of the coated foodstuff.

* * * * *